US00RE45694E

(19) United States
(12) Reissued Patent
Shin et al.

(10) Patent Number: US RE45,694 E
(45) Date of Reissued Patent: *Sep. 29, 2015

(54) CHARACTER INPUT APPARATUS AND METHOD FOR AUTOMATICALLY SWITCHING INPUT MODE IN TERMINAL HAVING TOUCH SCREEN

(71) Applicant: Samsung Electronics Co., Ltd., Suwon-si, Gyeonggi-do (KR)

(72) Inventors: Keun-Ho Shin, Suwon-si (KR); Young-Seop Han, Suwon-si (KR)

(73) Assignee: SAMSUNG ELECTRONICS CO., LTD., Suwon-Si (KR)

( * ) Notice: This patent is subject to a terminal disclaimer.

(21) Appl. No.: 14/026,360

(22) Filed: Sep. 13, 2013

Related U.S. Patent Documents

Reissue of:
(64) Patent No.: 8,018,441
Issued: Sep. 13, 2011
Appl. No.: 12/157,370
Filed: Jun. 10, 2008

(30) Foreign Application Priority Data

Jun. 11, 2007 (KR) ..... 10-2007-0056742
Jul. 19, 2007 (KR) ..... 10-2007-0072357

(51) Int. Cl.
*G06F 3/0486* (2013.01)
*G06F 3/042* (2006.01)
*G06F 3/043* (2006.01)

(52) U.S. Cl.
CPC ..... *G06F 3/0421* (2013.01); *G06F 3/0436* (2013.01)

(58) Field of Classification Search
CPC . G06F 3/0486; G06F 3/04845; G06F 3/0202; G06F 3/0488
USPC ..... 345/156–158, 168–169, 172–179; 341/22; 715/800, 801, 808, 815; 463/37–38; 178/18.01, 18.03, 178/18.05–18.07, 19.01–19.04
See application file for complete search history.

(56) References Cited

U.S. PATENT DOCUMENTS 5,952,942 A * 9/1999 Balakrishnan et al. ..... 341/20
6,169,538 B1 * 1/2001 Nowlan et al. ..... 345/168

(Continued)

FOREIGN PATENT DOCUMENTS

CN 1216602 5/1999
CN 1407434 4/2003

(Continued)

OTHER PUBLICATIONS

Office Action mailed Nov. 26, 2010 in related U.S. Appl. No. 12/157,370.

(Continued)

*Primary Examiner* — Ricardo L Osorio
(74) *Attorney, Agent, or Firm* — Staas & Halsey LLP

(57) ABSTRACT

[Provided is a character input method and apparatus for automatically switching an input mode in a terminal having a touch screen. If a press event occurs in one of key regions displayed in the touch screen, it is determined whether a drag event occurs prior to occurrence of a release event. According to whether the drag event occurs, one of a separate input mode for inputting one of characters of a corresponding character group and a text input mode for inputting a word including one of the characters of the character group is executed. Thus, a user can easily input a character by rapidly selecting a desired input mode.] *A character input method in a terminal having a touch screen. The character input may include a plurality of key regions, including a first key region and a second key region, being set to be displayed on the touch screen, and at least one character of a plurality of characters for the first region being set to be displayed over the second region based upon a touch input on the first region and a draft input starting from the touch input. A character corresponding to the at least one character is set to be displayed in a display region based on a release of the drag input.*

52 Claims, 9 Drawing Sheets

(56) References Cited

U.S. PATENT DOCUMENTS

| | | | | |
|---|---|---|---|---|
| 6,170,000 | B1 | 1/2001 | Bories et al. | |
| 6,178,989 | B1 | 1/2001 | Windschmitt et al. | |
| 6,562,078 | B1 | 5/2003 | Yang et al. | |
| 6,606,486 | B1 * | 8/2003 | Cubbage et al. | 455/186.2 |
| 7,057,607 | B2 * | 6/2006 | Mayoraz et al. | 345/173 |
| 7,098,896 | B2 * | 8/2006 | Kushler et al. | 345/168 |
| 7,245,290 | B2 | 7/2007 | Sugano | |
| 7,505,627 | B2 | 3/2009 | Chang | |
| 7,646,315 | B2 * | 1/2010 | Matteo et al. | 341/22 |
| 7,800,588 | B2 * | 9/2010 | Kim | 345/168 |
| 7,821,503 | B2 * | 10/2010 | Stephanick et al. | 345/173 |
| 2004/0177179 | A1 * | 9/2004 | Koivuniemi | 710/67 |
| 2005/0049861 | A1 | 3/2005 | Sugano | |
| 2005/0052431 | A1 | 3/2005 | Chang | |
| 2005/0089226 | A1 * | 4/2005 | Chang et al. | 382/181 |
| 2005/0099397 | A1 * | 5/2005 | Ono | 345/172 |
| 2005/0190147 | A1 * | 9/2005 | Kim | 345/156 |
| 2005/0275632 | A1 | 12/2005 | Pu et al. | |
| 2006/0119582 | A1 * | 6/2006 | Ng et al. | 345/168 |
| 2006/0161846 | A1 * | 7/2006 | Van Leeuwen | 715/702 |
| 2007/0046641 | A1 * | 3/2007 | Lim | 345/173 |
| 2007/0052682 | A1 | 3/2007 | Kang et al. | |
| 2007/0229476 | A1 * | 10/2007 | Huh | 345/173 |
| 2008/0180403 | A1 * | 7/2008 | Park et al. | 345/173 |
| 2009/0073137 | A1 | 3/2009 | Gao et al. | |

FOREIGN PATENT DOCUMENTS

| | | |
|---|---|---|
| DE | 10 2004 041 895 | 8/2004 |
| JP | 06-202784 | 7/1994 |
| JP | 2008-181608 | 6/2000 |
| JP | 2002-108543 | 4/2002 |
| JP | 2004-133915 | 4/2004 |
| JP | 2004-348695 | 12/2004 |
| JP | 2004-348695 A | 12/2004 |
| JP | 2005-078211 | 3/2005 |
| JP | 2005-129014 | 5/2005 |
| JP | 2005-182487 | 7/2005 |
| JP | 2005-535975 | 11/2005 |
| JP | 2006-023950 | 1/2006 |
| KR | 1020000042231 | 7/2000 |
| KR | 1020020016030 | 3/2002 |
| KR | 1020030008873 | 1/2003 |
| KR | 1020040016365 | 2/2004 |
| KR | 1020050025267 | 3/2005 |
| KR | 1020050073910 | 7/2005 |
| KR | 1020060052386 | 5/2006 |
| WO | 2006/024554 | 3/2006 |
| WO | 2007/070223 | 6/2007 |

OTHER PUBLICATIONS

Notice of Allowance mailed Aug. 15, 2011 in related U.S. Appl. No. 12/157,370.

Daisuke Sato et al., "Popie: A Japanese Method Utilizing FlowMenu", IPSJ Journal, Information Processing Society of Japan, Jul. 15, 2006.

U.S. Office Action mailed Jan. 23, 2015 in related U.S. Appl. No. 12/022,692.

U.S. Advisory Action mailed Dec. 30, 2014 in related U.S. Appl. No. 12/022,692.

U.S. Office Action mailed Oct. 7, 2014 in related U.S. Appl. No. 12/022,692.

U.S. Office Action mailed Jun. 12, 2014 in related U.S. Appl. No. 12/022,692.

U.S. Advisory Action mailed May 15, 2014 in related U.S. Appl. No. 12/022,692.

U.S. Office Action mailed Mar. 6, 2014 in related U.S. Appl. No. 12/022,692.

U.S. Interview Summary mailed Jan. 14, 2014 in related U.S. Appl. No. 12/022,692.

U.S. Office Action mailed Oct. 13, 2013 in related U.S. Appl. No. 12/022,692.

U.S. Interview Summary mailed Sep. 6, 2013 in related U.S. Appl. No. 12/022,692.

U.S. Office Action mailed Aug. 21, 2013 in related U.S. Appl. No. 12/022,692.

U.S. Office Action mailed Jun. 10, 2013 in related U.S. Appl. No. 12/022,692.

U.S. Office Action mailed Feb. 1, 2013 in related U.S. Appl. No. 12/022,692.

U.S. Advisory Action mailed Nov. 1, 2012 in related U.S. Appl. No. 12/022,692.

U.S. Office Action mailed Aug. 13, 2012 in related U.S. Appl. No. 12/022,692.

U.S. Office Action mailed Mar. 12, 2012 in related U.S. Appl. No. 12/022,692.

U.S. Advisory Action mailed Jan. 17, 2012 in related U.S. Appl. No. 12/022,692.

U.S. Office Action mailed Oct. 26, 2011 in related U.S. Appl. No. 12/022,692.

U.S. Office Action mailed Apr. 14, 2011 in related U.S. Appl. No. 12/022,692.

U.S. Appl. No. 12/022,692, filed Jan. 30, 2008, Se-Hwan Park, Samsung Electronics Co., Ltd.

* cited by examiner ( a ) ( b )

CHARACTER INPUT APPARATUS AND METHOD FOR AUTOMATICALLY SWITCHING INPUT MODE IN TERMINAL HAVING TOUCH SCREEN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION AND CLAIM OF PRIORITY

[This application claims the benefit under 35 U.S.C. §119 (a) of a Korean Patent Application filed in the Korean Intellectual Property Office on Jun. 11, 2007 and assigned Serial No. 2007-56742 and a Korean Patent Application filed in the Korean Intellectual Property Office on Jul. 19, 2007 and assigned Serial No. 2007-72357, the entire disclosures of which are hereby incorporated by reference.] *This application is a broadening reissue application of U.S. Pat. No. 8,018,441, which claims the benefit of U.S. application Ser. No. 12/157,370, filed with the U.S. Patent Trademark Office on Jun. 10, 2008 and issued as U.S. Pat. No. 8,018,441 on Sep. 13, 2011, and earlier priority benefit to Korean Patent Application No. 2007-72357 filed with the Korean Intellectual Property Office on Jul. 19, 2007 and Korean Patent Application No. 2007-56742 filed with the Korean Intellectual Property Office on Jun. 11, 2007, the disclosures of which are incorporated herein by reference.*

TECHNICAL FIELD OF THE INVENTION

The present invention relates to a method for inputting a character, and in particular, to a character input apparatus and method for automatically switching an input mode in a terminal having a touch screen.

BACKGROUND OF THE INVENTION

A text input method from among character input methods in conventional terminals, which will hereinafter be referred to as a 'T9' method, outputs frequently used characters by combinations of key inputs. The T9 method predicts a character to be input by a user in order to solve inconvenience in conventional character input methods. Using the T9 method, the user can output a desired character by pressing a key corresponding to the character once, as will be described with reference to FIG. 1 which illustrates a key input unit in a conventional terminal.

When the user desires to input 'pizza' in the key input unit illustrated in FIG. 1, numeric keys corresponding to characters have to be pressed in order of 7, 4, 4, 4, 9, 9, 9, 9, 9, 9, 9, 9, 2. In other words, the user has to press a key corresponding to a desired character several times in order to input the desired character. For example, in order to input 'z', the user can select 'z' from among four characters 'wxyz' assigned to a key 101 by pressing the key 101 four times. Moreover, when a character assigned to a key has to be input several times, the user may feel confused.

However, according to the T9 method, the desired word 'pizza' can be output by pressing once a key 104 to which 'p' is assigned, pressing one a key 103 to which 'i' is assigned, pressing twice a key 101 to which 'z' is assigned, and pressing once a key 102 to which 'a' is assigned. In other words, according to the T9 method, if the user presses numeric keys '7', '4', '9', '9', 2' including characters 'p', 'i', 'z', 'z', 'a', respectively, a terminal can output a word 'pizza' predicted by searching a previously stored dictionary. Thus, the user can conveniently input desired characters with a smaller number of key inputs when using the T9 method than when using conventional character input methods.

However, according to the T9 method, a problem occurs when the user desires to input a proper noun. According to the T9 method, only words predicted based on user's key inputs can be input. As a result, the user has to switch an input mode in order to select a desired character. Namely, the user can input a desired character only after switching an input mode from a T9 mode to a separate input mode. To this end, the user has to additionally input a mode switch key. In particular, the has to press the mode switch key several times when inputting a sentence composed of several words, increasing the overall number of key presses. This is also because the structure of characters displayed in the key input unit does not change even if the user presses the mode switch key. In other words, since two or more characters are assigned to each key even after switching to the separate input mode, an increase in the number of key inputs for character selection is inevitable.

As such, in a conventional terminal, the user has to perform a separate operation for mode switch in order to input a desired character, e.g., for a proper noun, in the T9 mode. Consequently, the user has to select a mode for character input whenever necessary, making more efforts for key input. Moreover, in order to input characters one by one, several key inputs are required to output a corresponding character, making a character input process complex and increasing the time required for the character input process.

As such, according to the prior art, the user has to switch an input mode in a separate way in order to input a proper noun in the mode using the T9 method. The conventional character input method requires an operation for mode switch for each character input, the character input process is complex and the time required therefor increases. Moreover, the conventional key input unit has a structural problem in that several key inputs are still required for character selection even after switching to the separate input mode.

SUMMARY OF THE INVENTION

To address the above-discussed deficiencies of the prior art, it is a primary aspect of the present invention to address at least the above problems and/or disadvantages and to provide at least the advantages described below. Accordingly, an aspect of the present invention is to a character input apparatus and method for automatically switching an input mode in a terminal having a touch screen, in which a user can select a desired input mode in a simple way and thus can input a character quickly.

Another aspect of the present invention is to provide a character input apparatus and method for automatically switching an input mode in a terminal having a touch screen, in which the time required for character input can be efficiently reduced by rapid switch from a T9 mode to a mode for selectively inputting a desired character.

According to one aspect of the present invention, there is provided a character input method for automatically switching an input mode in a terminal having a touch screen. The character input method includes assigning character groups, each of which includes at least two characters, to at least two key regions acquired by dividing a region of the touch screen and displaying the character groups in the corresponding key regions based on one-to-one correspondence, if a press event occurs in one of the key regions, determining whether a drag event occurs prior to occurrence of a release event, and executing one of a separate input mode for inputting one of the characters of a corresponding character group and a text input mode for inputting a word including one of the characters of the character group according to whether the drag event occurs.

According to another aspect of the present invention, there is provided a character input method for automatically switching an input mode in a terminal having a touch screen. The character input method includes, in a text input mode for inputting a word including one of the characters from character groups, each of which includes at least two characters, assigning the character groups to at least two key regions acquired by dividing a region of the touch screen and displaying the character groups in the corresponding key regions based on one-to-one correspondence, if a press event occurs in one of the key regions, counting time from a point of time at which the press event occurs, if the counted time exceeds a previously stored threshold value, switching to a separate input mode for inputting one of the characters from a corresponding character group, assigning the characters of the key region where the press event occurs to the remaining key regions except for the key region where the press event occurs and displaying the characters in the remaining key regions based on one-to-one correspondence in the separate input mode, determining whether a release event occurs in one of the key regions where the characters of the key region where the press event occurs are displayed in a state where occurrence of a drag event is sensed, and outputting a character in the key region where the release event occurs onto a predetermined input editor window of the touch screen.

According to another aspect of the present invention, there is provided a character input method for automatically switching an input mode in a terminal having a touch screen. The character input method includes assigning character groups, each of which includes at least two characters, to at least two key regions acquired by dividing a region of the touch screen and displaying the character groups in the corresponding key regions based on one-to-one correspondence, if a press event occurs in one of the key regions, determining whether a drag event occurs prior to occurrence of a release event, if it is determined that the drag event occurs, switching to a separate input mode for inputting one of the characters of a corresponding character group, checking distance and direction of the drag event, displaying a character corresponding to the checked distance and direction of the drag event from among characters of the key region where the press event occurs, and if the release event occurs when the character is displayed, outputting the displayed character.

According to another aspect of the present invention, there is provided a character input apparatus for automatically switching an input mode in a terminal having a touch screen. The character input apparatus includes a memory for storing character groups, each of which includes at least two characters, displayed in at least two key regions acquired by dividing a region of the touch screen based on one-to-one correspondence, a touch screen for displaying the character groups in the key regions based on one-to-one correspondence and generating a press event, a release event, and a drag event according to user input to each of the key regions, and a controller for determining whether the drag event occurs prior to occurrence of the release event if the press event occurs in one of the key regions of the touch screen and executing one of a separate input mode for inputting one of the characters of a corresponding character group and a text input mode for inputting a word including one of the characters of the character group according to whether the drag event occurs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 9c, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged touch screen device.

The matters defined in the description such as a detailed construction and elements are provided to assist in a comprehensive understanding of an exemplary embodiment of the invention. Accordingly, those of ordinary skill in the art will recognize that various changes and modifications of the exemplary embodiment described herein can be made without departing from the scope and spirit of the invention. Also, descriptions of well-known functions and constructions are omitted for clarity and conciseness.

The present invention suggests a character input apparatus and method for automatically switching an input mode in a terminal having a touch screen. When a press event occurs in one of the key regions displayed in the touch screen, the terminal determines whether a drag event occurs prior to occurrence of a release event and executes one of a separate input mode for inputting one of characters included in a corresponding character group and a text input mode for inputting a word including one of the characters included in the character group according to whether or not the drag event occurs. Such a method allows a user to rapidly select a desired input mode, thereby making it easy to input characters.

Figure 1:
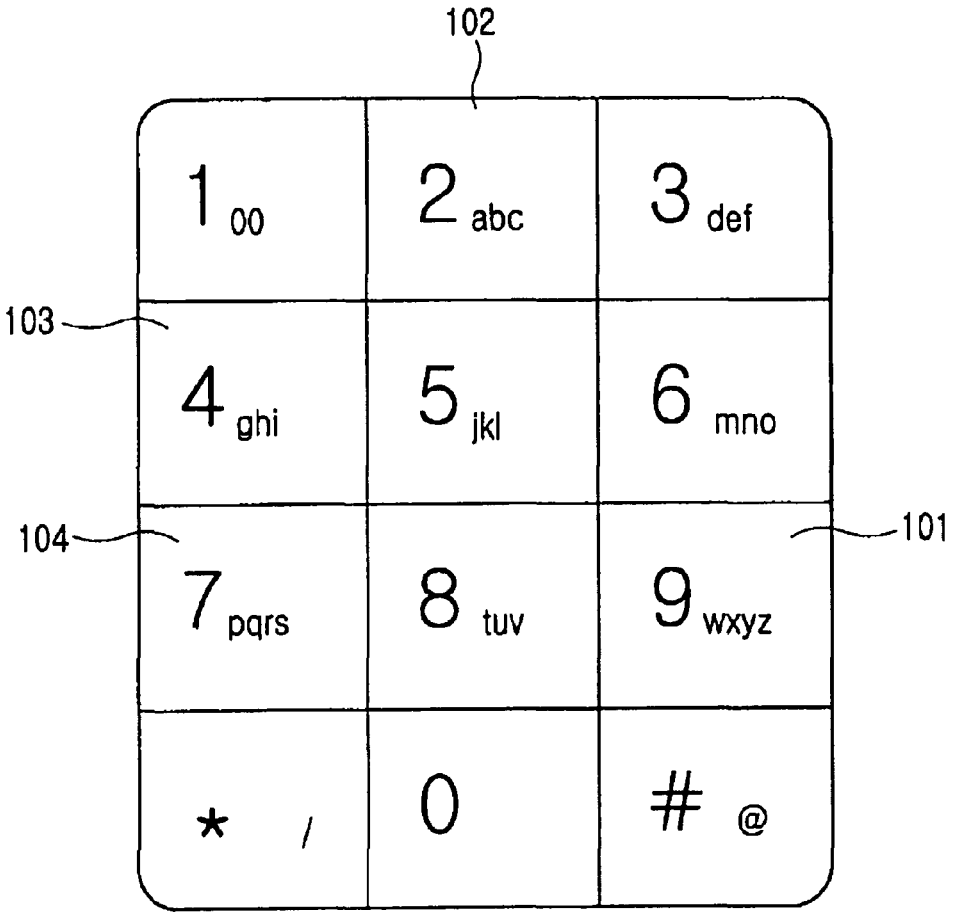
FIG.1 (PRIOR ART)
FIG. 1 illustrates a key input unit in a conventional terminal.
Figure 2:
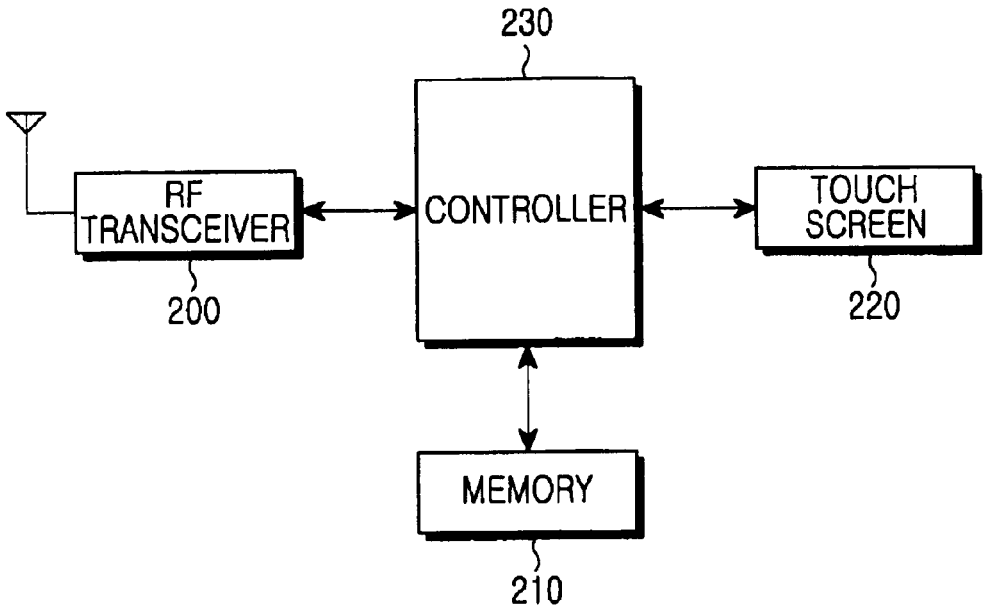
FIG. 2 is a block diagram of a character input apparatus according to an exemplary embodiment of the present invention.

FIG. 2 is a block diagram of a character input apparatus according to an exemplary embodiment of the present invention.

Referring to FIG. 2, the character input apparatus includes a radio frequency (RF) transceiver 200, a memory 210, a touch screen 220, and a controller 230. The RF transceiver 200 performs wireless communication of a terminal.

The memory 210 includes a read-only memory (ROM) and a random access memory (RAM) for storing a plurality of programs and data. In particular, the memory 210 stores words according to key combinations used in the text input mode according to an exemplary embodiment of the present invention. The memory 210 also stores character groups including consonants and vowels of the Hangul, capital letters and small letters of the English alphabet, numbers, and special characters, which all will hereinafter be referred to as characters, displayed in key regions of the touch screen 220. The character groups are divided depending on the number of key regions. More specifically, the number of character groups is the same as that of key regions, and the number of characters constituting a character group decreases as the number of key regions increases. The number of character groups may be adjusted for efficient character input from a user according to the screen size of the touch screen 220. In an exemplary embodiment of the present invention, character groups, each of which includes 3-4 English alphabets, are displayed in 3×3 key regions of the touch screen 220.

Upon touch of a character or a particular position in the touch screen 220 by a user's hand or an object, the touch screen 220 recognizes the touched position and performs a particular process using stored software. The touch screen 220 receives touch input from the user and displays display data under the control of the controller 230 or displays the operation state of a mobile communication terminal or information as icons and characters. In particular, the touch screen 220 according to the present invention displays key regions in for inputting characters and generates a press event, a release event, and a drag event according to user input under the control of the controller 230. The press event occurs when a key region is pressed. In other words, the press event occurs when there is a touch input in the key region from the user. The release event occurs when the pressing of the key region is released. The drag event occurs when there is a drag input from the user on key regions displayed in the touch screen 220.

The controller 230 assigns character groups, each of which includes at least two characters, to corresponding key regions output on the touch screen 220, and displays the character groups in the key regions based on one-to-one correspondence. The controller 230 determines whether the drag event occurs prior to occurrence of the release event if the press event occurs in one of the key regions, and executes one of the separate input mode for inputting one of characters in a corresponding character group and the text input mode for inputting a word including one of characters included in the character group according to whether the drag event occurs.

If the press event occurs in one of the key regions, the controller 230 may also count time from a point of time at which the press event occurs. The controller 230 then determines whether the counted time exceeds a previously stored threshold value and executes one of the separate input mode and the text input mode according to the determination result, as will be described in detail with reference to FIG. 3.

Figure 3:
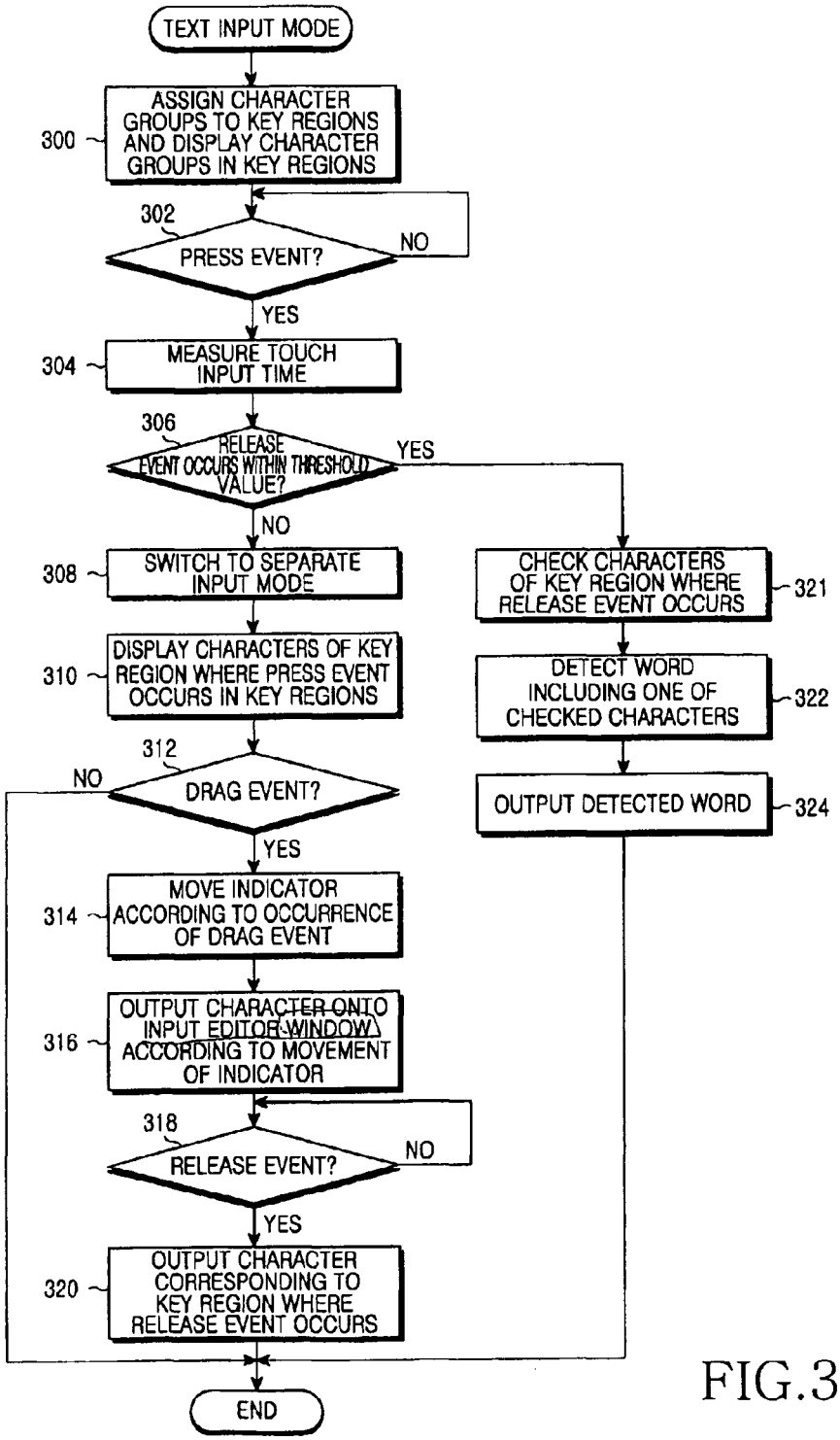
FIG. 3 is a control flowchart for inputting a character by automatically switching an input mode according to an exemplary embodiment of the present invention.
Figure 4:
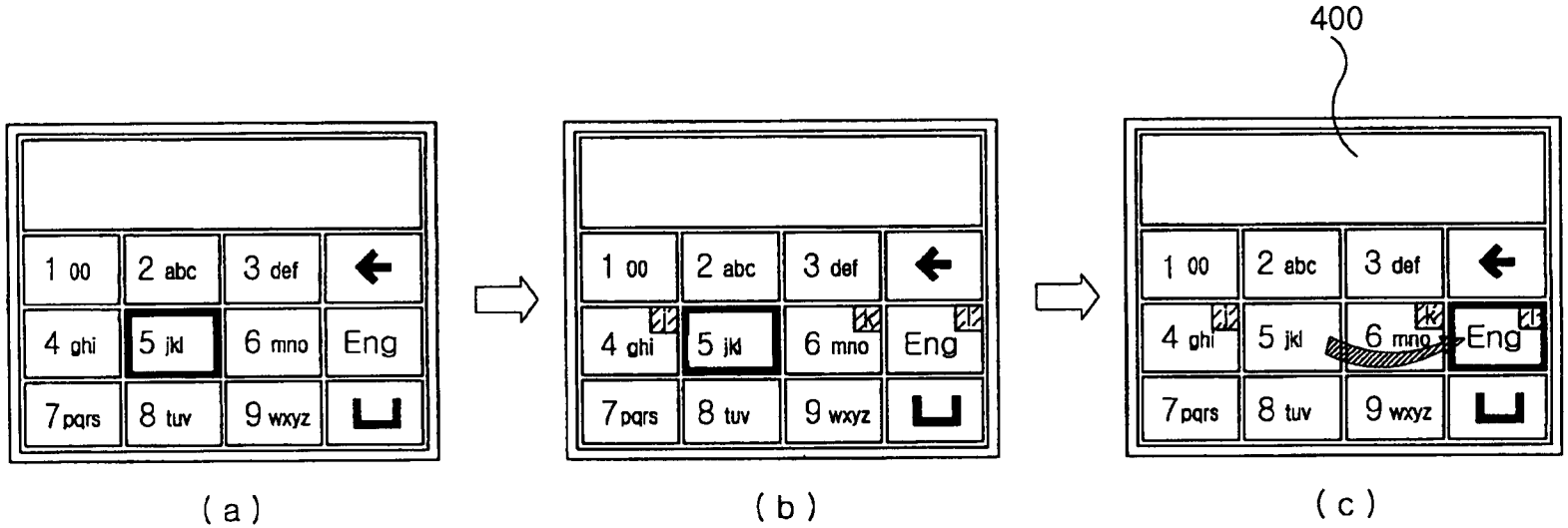
FIGS. 4a through 4c illustrate a process for inputting a character in a separate input mode according to an exemplary embodiment of the present invention.
Figure 5:
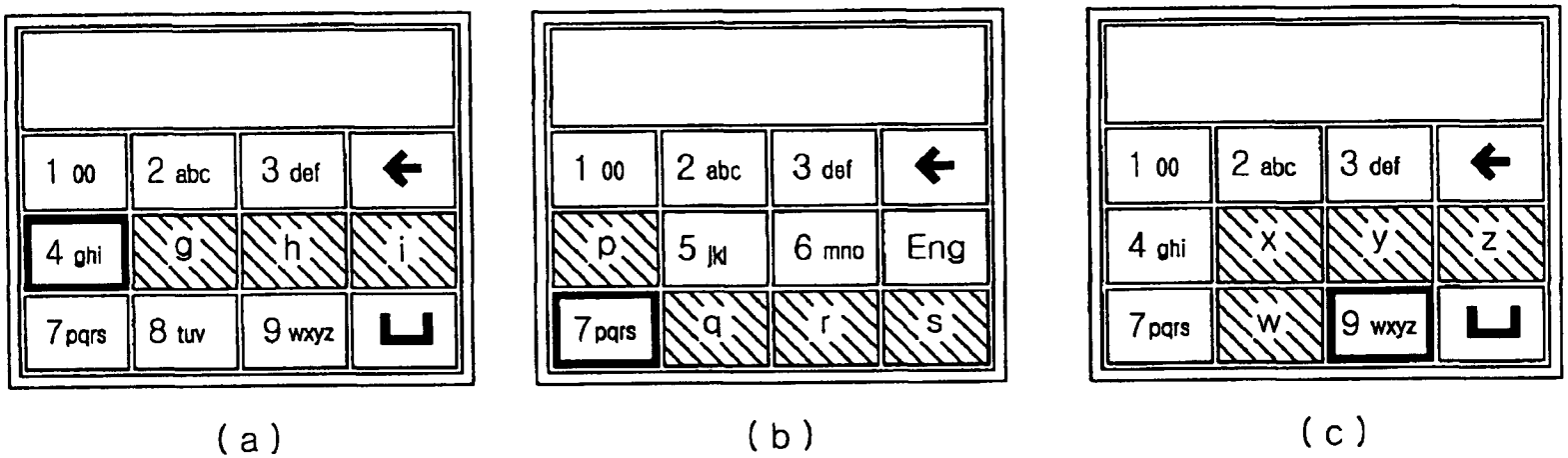
FIGS. 5a through 5c illustrate a way in which characters are displayed in the separate input mode according to an exemplary embodiment of the present invention.
Figure 6:
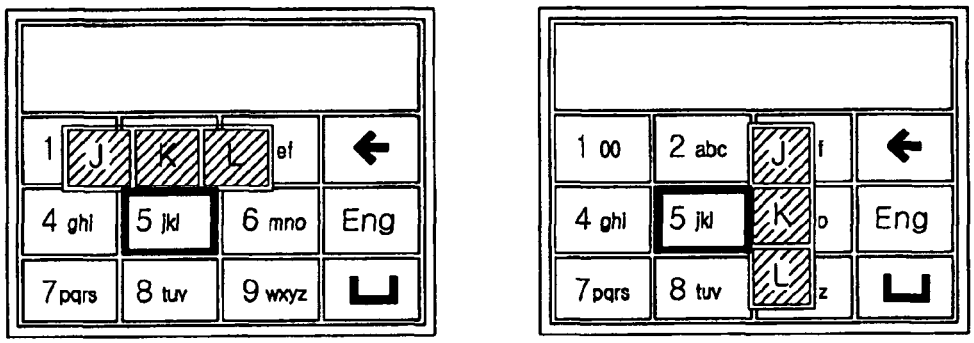
FIGS. 6a and 6b illustrate a way in which characters are displayed in the form of a pop-up window in the separate input mode according to an exemplary embodiment of the present invention.

FIG. 3 is a control flowchart for inputting a character by automatically switching an input mode according to an exemplary embodiment of the present invention.

Referring to FIG. 3, the controller 230 assigns character groups to key regions and displays the character groups in the key regions in the text input mode set by default based on one-to-one correspondence in step 300. The text input mode refers to a mode for inputting a desired word by pressing each of corresponding key regions once. Herein, a T9 mode will be taken as an example of the text input mode.

The controller 230 determines whether the press event occurs in step 302. According to an exemplary embodiment of the present invention, the press event occurs when a key region is pressed. If the press event occurs, the controller 230 measures touch input time in step 304. The touch input time is measured by counting elapsed time from a point in time at which the press event occurred. The measured touch input time is used to determine whether a touch input to a key region is made for a long or short duration. The controller 230 can make a determination by comparing the measured touch input time with the previously stored threshold value. In other words, the controller 230 determines that the touch input is made for a long duration if the measured touch input time exceeds the threshold value. If the measured touch input time does not exceed the threshold value, the controller 230 determines that the touch input is made for a short duration. Thus, the controller 230 determines whether the release event occurs within the threshold value in step 306. If the release event does not occur within the threshold value (i.e., the measured touch input time exceeds the threshold value), the controller 230 switches to the separate input mode in step 308. The separate input mode will be described in detail with reference to FIGS. 4a-4c.

FIGS. 4a through 4c illustrate a process for inputting a character in the separate input mode according to an exemplary embodiment of the present invention.

When one of the key regions displayed as illustrated in FIG. 4a is pressed longer than the threshold value, the controller 230 displays characters in the key region where the press event is generated in corresponding key regions in step 310. At this time, the characters are assigned to, and displayed in, existing key regions as illustrated in FIG. 4b. In particular, the characters may be assigned to, and displayed in, the remaining portions of the key regions except for portions where character groups corresponding to the key regions are displayed. Thus, the user can continue checking the entire key regions and easily select a next character, thereby reducing the overall time required for character input.

In a state where each of the characters in the key region where the press event occurs is displayed, the controller 230 determines whether the drag event occurs in step 312. If so, the controller 230 moves an indicator according to occurrence of the drag event in step 314.

In an exemplary embodiment of the present invention, if the drag event occurs in the key regions, the controller 230 determines whether a key region indicated according to distance and direction of the drag event is the same as one of the key regions in which the characters in the key region where the press event occurs are displayed.

If so, the controller 230 highlights the indicated key region. In an exemplary embodiment of the present invention, an indicator is displayed for the highlight. The indicator indicates a selected key region with visual effect in order to allow the user to recognize the selected key region. For example, the indicator indicates that a key region is selected by changing the color of the edges of the key region or shading in the key region. Thus, one of the key regions is highlighted by the indicator according to the drag event. The highlighted key region may be changed according to the drag event. The controller 230 outputs a character onto an input editor window according to movement of the indicator in step 316. In other words, whenever a key region is highlighted, the controller 230 outputs a character of the highlighted key region onto a predetermined input editor window 400 of the touch screen 220. Thus, the character output onto the input editor window 400 may be changed according to the drag event. The character is output in a corresponding position of a cursor indicating the input position of the character, and only the output character is changed according to the drag event without a change in the position of the cursor. As such, whenever a key region is highlighted, the controller 230 outputs a character of the highlighted key region onto the input editor window 400, thereby allowing the user to accurately and easily select a desired character.

In such a state where a character is output according to the drag event, the controller 230 determines whether the release event occurs in step 318. According to an exemplary embodiment of the present invention, the user selects a desired character by dragging a key region and inputs the selected character by releasing the pressing of the key region. Thus, the controller 230 determines whether the release event occurs after occurrence of the drag event in step 318. In the present invention, occurrence of the release event has the same meaning as input of a character. Thus, if the release event occurs, the controller 230 outputs a character corresponding to a key region where the release event occurs in step 320. Referring to FIG. 4c, if the release event occurs in a state where the indicator moves from the key region corresponding to 'jkl' to a key region corresponding to 'l' according to the drag event, the character 'l' of the key region indicated by the indicator is output onto the input editor window 400.

As mentioned above, if a key region is pressed for a short duration, the user can separately select and input a desired character. On the other hand, the user can input a desired word at a time by merely pressing a corresponding key region for a long duration. In other words, the user can directly input a desired word using a T9 mode.

More specifically, if the release event occurs within the threshold value in step 306, the controller 230 determines that the measured touch input time does not exceed the threshold value and thus the touch input is made for a short duration, and goes to step 321. In step 321, the controller 230 checks characters of a key region where the release event occurs. The controller 230 then detects a word including one of the checked characters in step 322 and outputs the detected word in step 324.

According to an exemplary embodiment of the present invention, if a key region corresponding to 'jkl' is pressed for input of the first character of the desired word, the controller 230 counts time from a point of time at which the press event occurs. If the counted time does not exceed a previously stored threshold value, the controller 230 determines whether the release event occurs in the key region corresponding to 'jkl'. If the controller 230 determines that the release event occurs, it searches for words including the characters 'j', 'k', and 'l' of the key region where the release event occurs. The controller 230 detects a word that is most frequently used from among words starting with 'j', 'k', and 'l', and outputs the detected word onto the input editor window 400. At this time, several words that are frequently used may be displayed and one of them may be output by a user's selection in the input editor window 400, or a word that is most frequently used may be automatically selected and output in the input editor window 400.

If the key region corresponding to 'jkl' is not pressed to input the first character of the desired word in the separate input mode (i.e., the user additionally inputs a character after another character is output), the controller detects a corresponding word by referring to words according to key combinations stored in the memory 210. For example, if the user presses a key region corresponding to 'tuv' after 's' is output, the controller 230 outputs onto the input editor window 400, a word 'sun' that is most frequently used as a combination with the already-output 's' by referring to the previously stored words.

As such, according to the present invention, the user can automatically select a desired mode without inputting a separate key or performing additional manipulation for selecting the separate input mode or the text input mode. Moreover, if word spacing starts by a space bar after completion of input of a word or a character, switching to the text input mode is automatically performed, thereby allowing the user to resume the above-described process.

According to an exemplary embodiment of the present invention, characters of a key region where the press event occurs in the separate input mode may be displayed as illustrated in FIGS. 5a through 5c unlike in FIGS. 4a through 4c.

FIGS. 5a through 5c illustrate a way in which characters are displayed in the separate input mode according to an exemplary embodiment of the present invention.

Referring to FIGS. 5a through 5c, if the press event occurs in one of key regions, characters of the key region where the press event occurs may be displayed enlarged in the key regions, instead of the original character groups displayed in the key regions.

When the key region where the press event occurs is located leftmost, the controller 230 may display the characters of the key region in the right side in a line as illustrated in FIG. 5a. If a large number of characters are assigned to one key region as illustrated in FIGS. 5b and 5c, the controller 230 may enlarge and display the characters in neighboring key regions around the pressed key region.

While characters are displayed enlarged in key regions except for the key region where the press event occurs in FIGS. 5a through 5c, one of them may also be displayed enlarged in the key region where the press event occurs according to an exemplary embodiment of the present invention.

The characters of the key region where the press event occurs may also be displayed using a pop-up window as illustrated in FIGS. 6a and 6b according to an exemplary embodiment of the present invention.

FIGS. 6a and 6b illustrate a way in which characters are displayed in the form of a pop-up window in the separate input mode according to an exemplary embodiment of the present invention.

As illustrated in FIGS. 6a and 6b, if the press event occurs in one of key regions, a vertical or horizontal pop-up window around the key region where the press event occurs is output. In other words, the controller 230 enlarges and displays characters of the key region where the press event occurs in at least two key regions of a pop-up window type. A method of outputting the pop-up window is not limited, and may be implemented in various ways as long as it improves a user's convenience according to an exemplary embodiment of the present invention.

As such, according to the present invention, characters of a pressed key region in the separate input mode can be displayed in various ways. For example, the characters may be assigned to and displayed in corresponding key regions or may be displayed enlarged in at least two key regions of a pop-up window type.

Moreover, although a description has been made regarding the English alphabet in an exemplary embodiment of the present invention, the present invention may also be applied to various types of characters such as the Hangul, special characters, and the like.

In the foregoing embodiment of the present invention, time from a point of time at which the press event occurs is counted and one of the separate input mode and the text input mode is executed based on the counted time. However, one of the separate input mode and the text input mode may also be executed according to whether the drag event occurs prior to occurrence of the release event after the press event occurs according to an exemplary embodiment of the present invention. More specifically, when the release event occurs after occurrence of the press event (i.e., the drag event does not occur), the controller 230 executes the text input mode in which a desired word can be input at a time. If it is determined that the drag event occurs, the controller 230 switches to the separate input mode for character input from a user.

On the other hand, a character may also be input to the controller 230 without screen change during mode switch.

Figure 7:
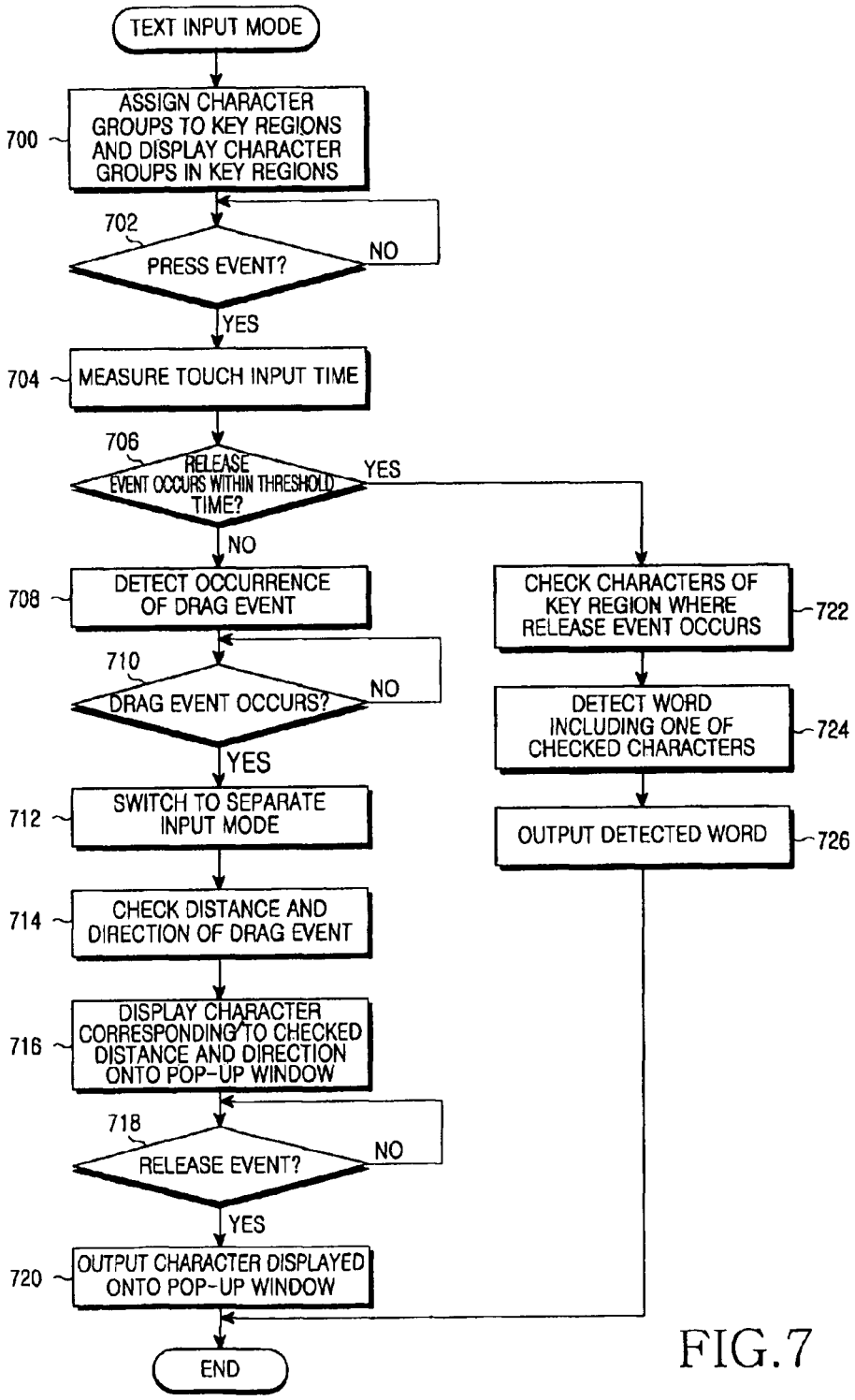
FIG. 7 is a control flowchart for inputting a character in one of a separate input mode and a text input mode, which is selected according to whether a drag event occurs, according to an exemplary embodiment of the present invention.

FIG. 7 is a control flowchart for inputting a character in one of the separate input mode and the text input mode, which is selected according to whether the drag event occurs, according to an exemplary embodiment of the present invention.

Figure 8:
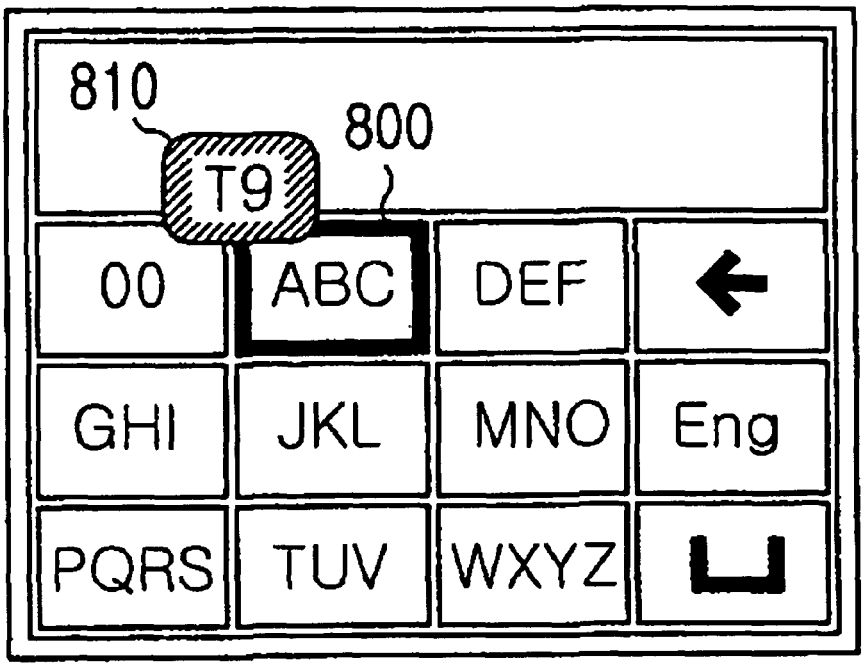
FIG. 8 illustrates an initial screen in a text input mode according to an exemplary embodiment of the present invention.
Figure 9:
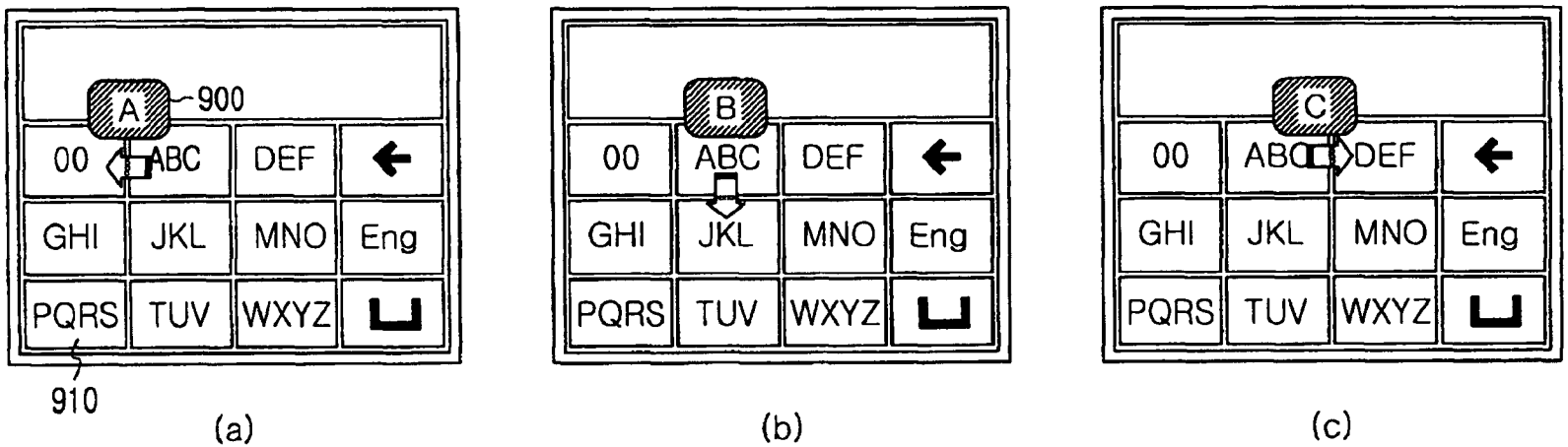
FIGS. 9a through 9c illustrate a screen in which a character is selected and input in a separate input mode according to an exemplary embodiment of the present invention.

Referring to FIG. 7, in the text input mode, the controller 230 assigns character groups to corresponding key regions and displays the character groups in the key regions based on one-to-one correspondence in step 700. In step 702, the controller 230 determines whether the press event occurs in step 702. According to an exemplary embodiment of the present invention, an initial screen in the text input mode is as illustrated in FIG. 8. In FIG. 8, key regions are illustrated with characters and the characters may also be assigned to the key regions, together with a number like in the key regions described above.

In FIG. 8, a key region assigned 'ABC' is selected from among the key regions. As illustrated in FIG. 8, a user may select a key region 800 assigned 'ABC' from among all the key regions. According to an exemplary embodiment of the present invention, when the user select one of the key regions in the text input mode, a pop-up window 810 indicating the text input mode is output. Thus, the user can recognize which input mode is being executed when inputting a character.

If it is determined that the press event occurs in one of the key regions according to user's selection, the controller 230 measures touch input time in step 704. In other words, the controller 230 measures time counted from a point of time at which the press event occurs. The controller 230 determines whether the release event occurs within predetermined threshold time in step 706. If not, the controller 230 detects whether the drag event occurs in step 708. In the embodiment illustrated in FIG. 7, the drag event is used as a criterion for switching from the text input mode to the separate input mode. If it is determined that the drag event occurs in step 710, the controller 230 switches to the separate input mode in step 712. The controller 230 checks distance and direction of the drag event in step 714 and displays a character corresponding to the checked distance and direction onto a pop-up window. Such character selection in the separate input mode will be described in more detail with reference to FIGS. 9a through 9c.

FIGS. 9a through 9c illustrate a screen in which a character is selected and input in the separate input mode according to an exemplary embodiment of the present invention. When the user presses the key region 800 assigned 'ABC' as illustrated in FIG. 8, the controller 230 detects whether the drag event occurs prior to occurrence of the release event. When the drag event occurs, the controller 230 switches to the separate input mode. At this time, in spite of mode switch, arrangement of characters displayed in each of key regions does not change.

In the separate input mode, the controller 230 displays one of characters in a key region where the press event occurs onto a screen according to distance and direction of the drag event. For example, when the user performs drag input to the left as illustrated in FIG. 9a, the controller 230 displays a character 'A' located to the left of a character 'B' located in the center of characters 'ABC' onto a pop-up window 900. When the user performs drag input downwardly from the selected key region as illustrated in FIG. 9b, the controller 230 displays the center character 'B' onto the pop-up window 900. When the user performs drag input to the right as illustrated in FIG. 9c, the controller 230 displays the character 'C' located to the right of the center character 'B' onto the pop-up window 900.

For a key region assigned four characters like a key region 910 assigned characters 'PQRS', the controller 230 displays one of the characters corresponding to the drag event based on the character 'Q' in a second leftmost position onto the pop-up window 900. More specifically, when the drag event occurs to the right of 'Q' in the key region 910, the controller 230 outputs 'R' onto the pop-up window 900. When the drag event occurs to the left of 'Q', the controller 230 outputs 'P' onto the pop-up window 900. When the drag event occurs downwardly, the controller 230 outputs 'Q' onto the pop-up window 900. On the other hand, the controller 230 sets a position distant a predetermined distance from a position where 'Q' is displayed and outputs a corresponding character 'S' when the drag event occurs at a position distant more than the preset distance. Such a process may also allow characters to be input according to up, down, left, and right directions like character input corresponding to key regions having three characters assigned thereto.

As such, the controller 230 displays a corresponding character onto a pop-up window according to a user's drag input (i.e., occurrence of the drag event). The user then releases the pressing of a key region when the desired character is displayed onto the pop-up window in order to output the character onto an input editor window. Thus, the controller 230 determines whether the release event occurs in step 718 and outputs the character displayed onto the pop-up window in step 720.

When the release event occurs within the predetermined threshold time (i.e., the release event occurs after the press event occurs in step 706), the controller 230 goes to step 722 in order to execute the text input mode. The controller 230 then checks characters of a key region where the release event occurs in step 722 and detects a word including one of the checked characters in step 724. Referring to FIG. 8, the controller 230 detects a word including one of 'ABC' displayed in the key region 800 selected by the user. The controller 230 then goes to step 726 in order to output the detected word.

As such, the user can input a character in a faster and easier way with less effort to select the character by using the character input method in various forms.

As is apparent from the foregoing description, the present invention allows the user to automatically select a desired input mode, thereby improving convenience in and speed of character input. Moreover, the present invention can also be used in various input apparatuses as well as a terminal having a touch screen.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A character input method for automatically switching an input mode in a terminal having a touch screen, the character input method comprising:

assigning character groups, each of which includes at least two characters, to at least two key regions acquired by dividing a region of the touch screen and displaying the character groups in the corresponding key regions based on one-to-one correspondence;

if a press event occurs in a first of the key regions, determining whether a drag event occurs prior to occurrence of a release event;

executing one of a separate input mode for inputting one of characters of a corresponding character group and a text input mode for inputting a word including one of the characters of the character group according to whether the drag event occurs; and upon execution of the separate input mode, assigning each character of the character group associated with the first key region to a different one of the key regions other than the first key region and displaying the characters of the character group in the other key regions.

2. The character input method of claim 1, further comprising:

if the press event occurs in the first key region, counting time from a point of time at which the press event occurs;

determining whether the counted time exceeds a previously stored threshold value; and executing one of the separate input mode for inputting one of characters of a corresponding character group and the text input mode for inputting a word including one of the characters of the character group according to a determination result.

3. The character input method of claim 1, further comprising:

determining whether a key region indicated according to distance and direction of the drag event is the same as one of the key regions where the characters of the key region where the press event occurs are displayed;

highlighting the indicated key region if it is determined that the key region is the same as one of the key regions; and if the release event occurs in the highlighted key region, outputting a character of the key region where the release event occurs onto, a predetermined input editor window of the touch screen.

4. The character input method of claim 3, further comprising, each time one of the key regions where the characters of the key region where the press event occurs are displayed is highlighted, outputting the character of the highlighted key region onto the input editor window.

5. The character input method of claim 3, wherein the displaying of the characters of the key region where the press event occurs in the key regions based on one-to-one correspondence comprises displaying the characters of the key region where the press event occurs in second portions of the key regions except for first portions where the character groups of the key regions are displayed based on one-to-one correspondence.

6. The character input method of claim 3, wherein the displaying of the characters of the key region where the press event occurs in the key regions based on one-to-one correspondence comprises enlarging and displaying the characters of the key region where the press event occurs in the key regions based on one-to-one correspondence, instead of the character groups of the key regions.

7. The character input method of claim 3, wherein the displaying of the characters of the key region where the press event occurs in the key regions based on one-to-one correspondence comprises enlarging and displaying the characters of the key region where the press event occurs in at least two key regions of a pop-up window type.

8. The character input method of claim 1, further comprising:

if the text input mode is executed, determining whether the release event occurs prior to occurrence of the drag event;

if the release event occurs, searching for words including a character of a key region where the release event occurs;

detecting a word that is most frequently used based on a search result; and outputting the detected word.

9. A character input method for automatically switching an input mode in a terminal having a touch screen, the character input method comprising:

in a text input mode for inputting a word including one of characters from character groups, each of which includes at least two characters, assigning the character groups to at least two key regions acquired by dividing a region of the touch screen and displaying the character groups in the corresponding key regions based on one-to-one correspondence;

if a press event occurs in a first of the key regions, counting time from a point of time at which the press event occurs;

if the counted time exceeds a previously stored threshold value, switching to a separate input mode for inputting one of characters from a corresponding character group;

upon execution of the separate input mode, assigning each character of the character group associated with the first key region to a different one of the key regions other than the first key region key region and displaying the characters of the character group in the other key regions;

determining whether a release event occurs in one of the other key regions assigned to the each character; and outputting a character in the key region where the release event occurs onto a predetermined input editor window of the touch screen.

10. The character input method of claim 9, further comprising:

if the counted time does not exceed the previously stored threshold value, determining whether the release event occurs;

if the release event occurs, searching for words including characters of the key region where the release event occurs;

detecting a word that is most frequently used based on a search result; and outputting the detected word.

11. A character input method for automatically switching an input mode in a terminal having a touch screen the character input method comprising:

assigning character groups, each of which includes at least two characters, to at least two key regions acquired by dividing a region of the touch screen and displaying the character groups in the corresponding key regions based on one-to-one correspondence;

if a press event occurs in one of the key regions, determining whether a drag event occurs prior to occurrence of a release event;

if it is determined that the drag eve occurs, switching to a separate input mode for inputting one of characters of a corresponding character group;

upon execution of the separate input mode, checking a distance and a direction of the drag event;

displaying a character corresponding to the checked distance and direction of the drag event from among characters of the key region where the press event occurs; and if the release event occurs when the character is displayed, outputting the displayed character.

12. The character input method of claim 11, further comprising:

if the press event occurs in one of the key regions, counting time from at point of time at which the press event occurs;

determining whether the release event occurs within previously stored threshold time; and if it is determined that the release event occurs, executing a text input mode for inputting a word including one of the characters of the corresponding character group.

13. The character input method of claim 11, wherein the displaying of the character comprises enlarging and displaying the character onto a key region in the form of a pop-up window.

14. The character input method of claim 11, wherein the displaying of the character comprises displaying a character corresponding to the checked distance and direction of the drag event.

15. The character input method of claim 11, wherein a text input mode is a mode using a T9 input method.

16. A character input apparatus for automatically switching an input mode in a terminal having a touch screen, the character input apparatus comprising:

a memory configured to store character groups, each of which includes at least two characters, displayed in at least two key regions acquired by dividing a region of the touch screen based on one-to-one correspondence;

a touch screen configured to display the character groups in the key regions based on one-to-one correspondence and generating a press event, a release event, and a drag event according to user input to each of the key regions; and a controller configured to:

determine whether the drag event occurs prior to occurrence of the release event if the press event occurs in a first of the key regions of the touch screen;

execute one of a separate input mode for inputting one of characters of a corresponding character group and a text input mode for inputting a word including one of the characters of the character group according to whether the drag event occurs; and upon execution of the separate input mode, assign each character of the character group associated with the first key region to a different one of the key regions other than the first key region and display the characters of the character group in the other key regions.

17. The character input apparatus of claim 16, wherein the controller counts time from a point of time at which the press event occurs if the press event occurs in one of the key regions, determines whether the counted time exceeds a previously stored threshold value, and executes one of the separate input mode for inputting one of characters of a corresponding character group and the text input mode for inputting a word including one of the characters of the character group according to a determination result.

18. The character input apparatus of claim 16, wherein the controller determines whether a key region indicated according to distance and direction of the drag event is the same as one of the key regions where the characters of the key region where the press event occurs are displayed, highlights the indicated key region if it is determined that the key region is the same as one of the key regions, and outputs a character of the key region where the release event occurs onto a predetermined input editor window of the touch screen if the release event occurs in the highlighted key region.

19. The character input apparatus of claim 18, wherein each time one of the key regions where the characters of the key region where the press event occurs are displayed is highlighted, the controller outputs the character of the highlighted key region onto the input editor window.

20. The character input apparatus of claim 18, wherein the touch screen displays the characters of the key region where the press event occurs in second portions of the key regions except for first portions where the character groups of the key regions are displayed based on one-to-one correspondence under the control of the controller.

21. The character input apparatus of claim 18, wherein the touch screen enlarges and displays the characters of the key region where the press event occurs in the key regions based on one-to-one correspondence, instead of the character groups of the key regions under the control of the controller.

22. The character input apparatus of claim 18, wherein the touch screen enlarges and displays the characters of the key region where the press event occurs in at least two key regions of a pop-up window type under the control of the controller.

23. The character input apparatus of claim 16, wherein the controller determines whether the release event occurs prior to occurrence of the drag event if the text input mode is executed, searches for words including a character of a key region where the release event occurs if the release event occurs, detects a word that is most frequently used based on a search result, and outputs the detected word.

24. The character input apparatus of claim 16, wherein the controller outputs the detected word onto the touch screen using a T9 input method in a text input mode.

*25. A character input method in a terminal having a touch screen, the character input method comprising:*

*displaying a plurality of key regions, including a first key region and a second key region, on the touch screen, wherein a plurality of respective characters are presented in each of the first and second key regions;*

*displaying, based upon a touch input on the first region and a drag input starting from the touch input, at least one character of the plurality of characters for the first region over the second region, wherein the at least one*

*character of the plurality of characters for the first key region is assigned to be displayed over the second key region; and*

*displaying a character corresponding to the at least one character in a display region based on a release of the drag input.*

*26. The character input method of claim 25, further comprising performing the assigning of the at least one character of the plurality of characters for the first region to be displayed over the second region upon a detected initiation of the drag input.*

*27. The character input method of claim 26, wherein the initiation of the drag input is detected based on the touch input being maintained for a predetermined period of time and/or a detected movement over the touch screen of a maintained touching of the touch screen beginning at a position over the first key region.*

*28. The character input method of claim 25, further comprising*

*if the touch input occurs on the first region, determining whether the drag input occurs prior to a release of the touch input;*

*executing one of a separate input mode for inputting at least one character of the plurality of characters for the first key region and a text input mode for inputting a word including at least one character of the plurality of characters for the first key region based on a result of the determining of whether the drag input occurs prior to the release of the touch input; and*

*displaying the at least one character of the plurality of characters for the first key region over the second key region upon execution of the separate input mode.*

*29. The character input method of claim 28, further comprising:*

*the text input mode is executed based on a determining of whether the release of the touch input occurs prior to an occurrence of the drag input;*

*if the release of the touch input occurs prior to the occurrence of the drag input, searching for words including a character of a key region where the release of the touch input occurs;*

*detecting a word that is most frequently used based on a search result; and*

*outputting the detected word.*

*30. The character input method of claim 25, wherein the drag input is detected based upon a maintaining and movement of the received touch input relative to the touch screen.*

*31. The character input method of claim 25, wherein the displaying of the character corresponding to the at least one character in the display region further comprises outputting to a screen of the terminal the character corresponding to the at least one character upon the release of the drag input, indicating a selection of the character corresponding to the at least one character of the plurality of characters for the first key region.*

*32. The character input method of claim 31, wherein the output of the one of the at least one character is to a predetermined input editor window of the touch screen.*

*33. The character input method of claim 25, wherein the displaying of the at least one character includes displaying all of the characters of the plurality of characters for the first key region.*

*34. The character input method of claim 33, wherein the displaying of the at least one character includes displaying one or more of the characters of the plurality of characters group for the first key region in one or more respective pop-up regions displayed over at least the second key region.*

*35. The character input method of claim 33, wherein the displaying of the at least one character includes displaying all of the characters of the plurality of characters for the first key region only over one or more key regions of the plural key regions, other than the first key region and including the second key region.*

*36. The character input method of claim 35, wherein the displaying of the at least one character includes displaying all of the characters of the plurality of characters for the first key region in one or more respective pop-up regions.*

*37. The character input method of claim 35, wherein the displaying of the at least one character includes displaying all of the characters of the plurality of characters for the first key region over two or more key regions of the plural key regions, other than the first key region and including the second key region.*

*38. The character input method of claim 37, wherein the displaying of the at least one character includes displaying all of the characters of the plurality of characters for the first key region in one or more respective pop-up regions displayed over the two or more key regions of the of the plural key regions.*

*39. The character input method of claim 25, wherein the drag input is detected based upon a maintaining and movement of a touch input relative to the touch screen.*

*40. The character input method of claim 25, wherein the displaying of the at least one character includes displaying less than all of the characters of the plurality of characters for the first key region.*

*41. The character input method of claim 40, wherein the displaying of the at least one character includes displaying less than all of the characters of the plurality of characters for the first key region in at least one respective pop-up region displayed over at least the second key region.*

*42. The character input method of claim 40, wherein the displaying of the at least one character includes displaying less than all of the characters of the plurality of characters for the first key region only over one or more key regions of the plural key regions, other than the first key region and including the second key regions.*

*43. The character input method of claim 42, wherein the displaying of the at least one character includes displaying less than all of the characters of the plurality of characters for the first key region in at least one respective displayed pop-up region.*

*44. The character input method of claim 42, wherein the displaying of the at least one character includes displaying less than all of the characters of the plurality of characters for the first key region over two or more key regions of the plural key regions, other than the first key region and including the second key region.*

*45. The character input method of claim 44, wherein the displaying of the at least one character includes displaying less than all of the characters of the plurality of characters for the first key region in at least one respective pop-up region displayed over the two or more key regions of the plural key regions.*

*46. The character input method of claim 25, further comprising highlighting one or more of the at least one character, as displayed over at least the second key region.*

*47. The character input method of claim 46, wherein the highlighting of the one or more of the at least one character displayed over at least the second key region is based on the detected drag input.*

*48. The character input method of claim 47, wherein the highlighted one or more of the at least one character are displayed in a pop-up region.*

*49. The character input method of claim 47, wherein the displaying of the plural key regions includes displaying a plurality of second key regions, other than the first key region and including the second key region, and the at least one character is displayed in a pop-up region over a select one or more key region of the plurality of second key regions, such that selection of which of the plurality of second key regions the at least one character is displayed over is determined based upon a direction of the detected drag input.*

*50. The character input method of claim 25, wherein the plural key regions include a plurality of rectangular-type key regions in a form of 3×3 layout.*

*51. The character input method of claim 50, wherein the plurality of rectangular-type key regions include:*

*a 1st key region including a 1st character group having the characters 'a', 'b', and 'c';*

*a 2nd key region including a 2nd character group having the characters 'd', 'e', and 'f';*

*a 3rd key region including a 3rd character group having the characters 'g', 'h', and 'i';*

*a 4th key region including a 3rd character group having the characters 'j', 'k', and 'l';*

*a 5th key region including a 5th character group having the characters 'm', 'n', and 'o';*

*a 6th key region including a 6th character group having the characters 'p', 'q', 'r', and 's';*

*a 7th key region including a 7th character group having the characters 't', 'u', and 'v'; and*

*a 8th key region including a 8th character group having the characters 'w', 'x', 'y', and 'z'.*

*52. A non-transitory computer readable medium comprising computer readable code to control at least one processing device to implement the method of claim 25.*

* * * * *

UNITED STATES PATENT AND TRADEMARK OFFICE

CERTIFICATE OF CORRECTION

PATENT NO. : RE45,694 E
APPLICATION NO. : 14/026360
DATED : September 29, 2015
INVENTOR(S) : Keun-Ho Shin et al.

It is certified that error appears in the above-identified patent and that said Letters Patent is hereby corrected as shown below:

IN THE CLAIMS

Claim 38, Column 16, Line 21

Delete "of the of the" and insert --of the--, therefor.

Signed and Sealed this
Eighth Day of December, 2015

Michelle K. Lee

Michelle K. Lee
*Director of the United States Patent and Trademark Office*